Aug. 31, 1965

R. S. ROOT 3,203,520

CLUTCH BRAKE

Filed March 16, 1961

INVENTOR:
ROBERT S. ROOT,
BY *R. Emmett Thompson*
HIS ATTORNEY.

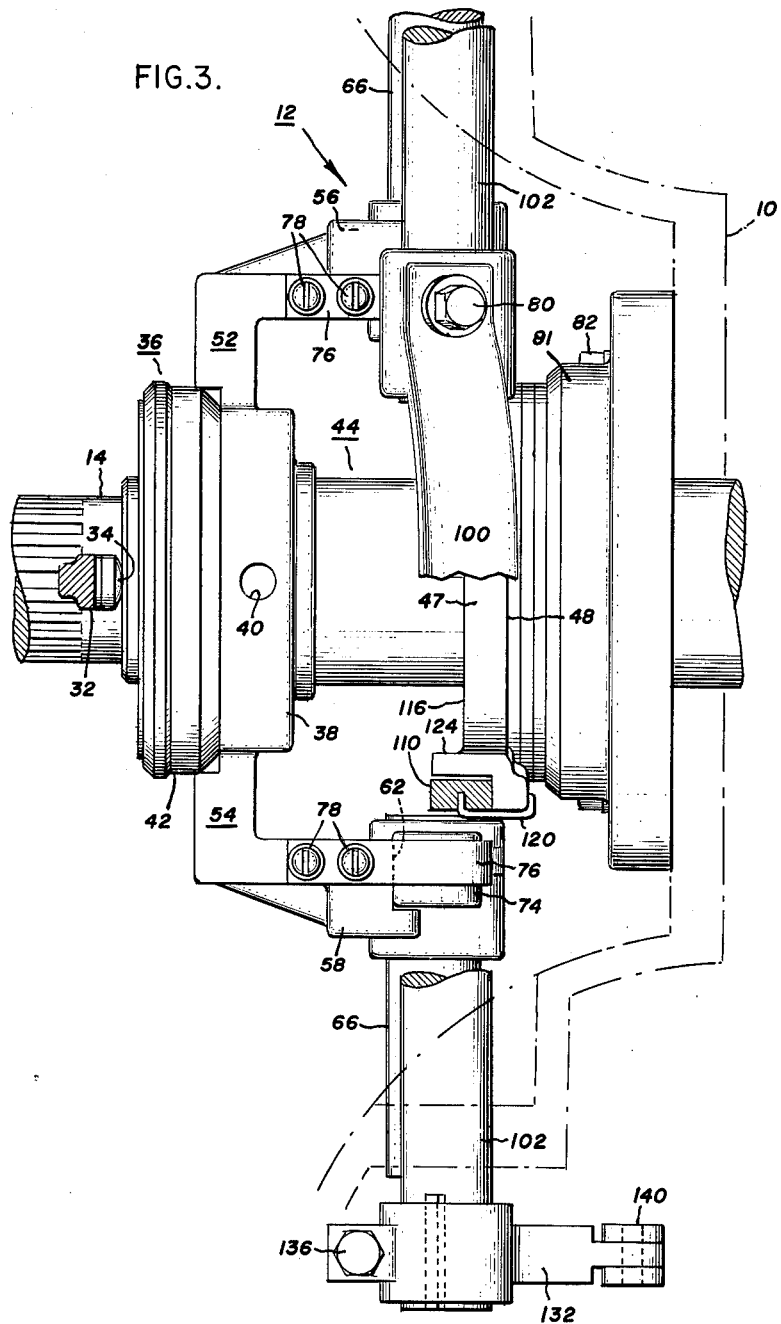

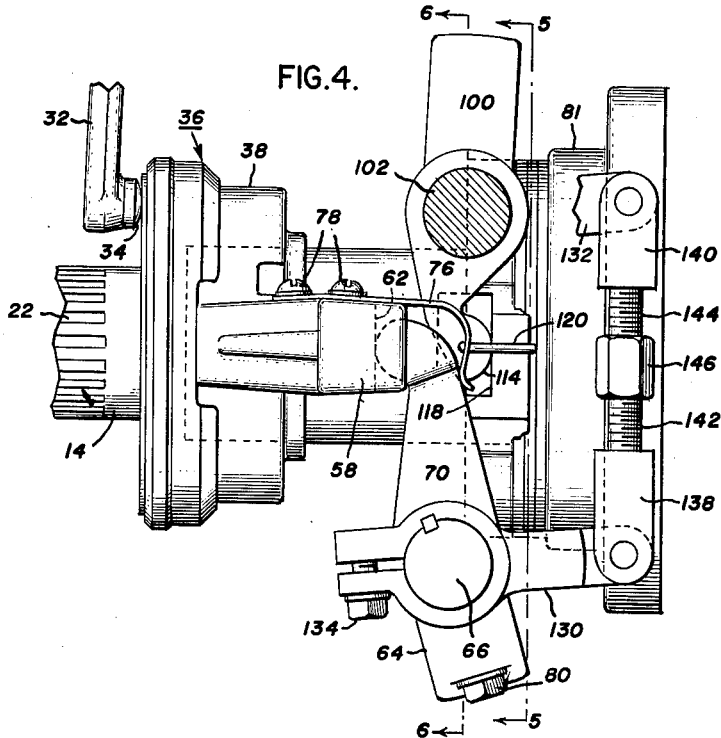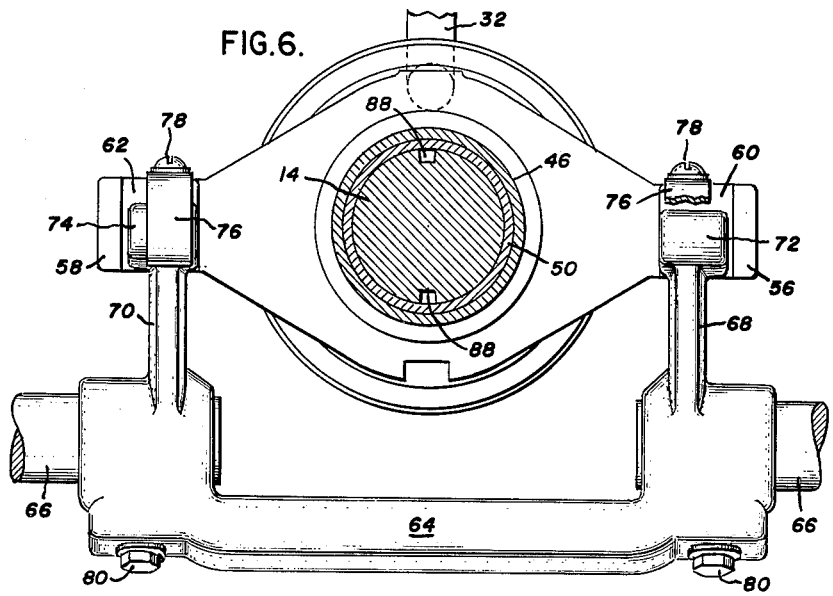

United States Patent Office  3,203,520
Patented Aug. 31, 1965

3,203,520
CLUTCH BRAKE
Robert S. Root, Syracuse, N.Y., assignor to Lipe-Rollway Corporation, Syracuse, N.Y., a corporation of New York
Filed Mar. 16, 1961, Ser. No. 96,131
1 Claim. (Cl. 192—13)

This invention relates to and has as a general object a new and improved clutch brake.

In heavy duty clutches for automotive vehicles, such as trucks, or the like, it is desirable to brake the driven member of the clutch to a halt after first effecting a disengagement of the driving and driven members in order to facilitate the shifting of the transmission from one speed to another. The braking eliminates drag on the driven member, which is due to momentum and thus permits the rapid and easy shifting of the vehicle's transmission.

Clutches of the type herein referred to are of the heavy duty plate or disc type and comprise a driving member and a driven member, which is connected to the driving member by means of a plurality of friction discs and pressure plates, as is well known in the art. Such clutches take one of two forms. The clutch may be arranged so that by pulling the throw-out member rearwardly in a direction axially away from the friction discs, the pressure plates and discs are disengaged to disengage the driving connection between the driving member and the driven member. Such clutches are referred to in the trade as, "pull clutches." The second type of clutches is one wherein the clutch throw-out member is pushed forwardly in an axial direction towards the friction discs and pressure plates and this movement through a lever arrangement serves to disengage the driving connection. This second type of clutch is known in the trade as a "push clutch." It is a relatively simple matter to provide a pull type clutch with a brake arrangement and in such clutches the movement of the throw-out member is utilized to effect the braking action, the braking means being conventionally located behind the throw-out member on the driven shaft. A clutch of this type is disclosed and claimed in my prior Patent No. 2,863,533, issued December 9, 1958.

As will be readily apparent, however, in connection with the so-called push clutches, it is somewhat difficult to provide the clutch with a brake since the movement of the clutch throw-out member is toward the friction discs and pressure plates and accordingly, present a problem concerning the arrangement of a brake for such a clutch.

Accordingly, it is a more specific object of this invention to provide a push type clutch with a brake.

The invention consists in the novel features and in the combinations and constructions hereinafter set forth and claimed.

In describing this invention, reference is had to the accompanying drawings in which like characters designate corresponding parts in all the views.

In the drawings—

FIGURE 3 is a top plan view of FIGURE 2.

FIGURE 4 is a side elevational view similar to FIGURE 1.

FIGURE 6 is a view taken looking in the direction of the arrows of line 6—6 on FIGURE 4.

Briefly described, the invention comprises a friction clutch having driving and driven members and means normally effecting a driving connection between said members, means for disengaging the driving connection including a clutch throw-out member movable in a first direction to disengage said driving connection and motion reversing means operable in response to movement of said throw-out member in said first direction to move brake means in an opposite direction to brake the driven member after the driving connection between said driving and driven members has been disengaged.

Figure 1:
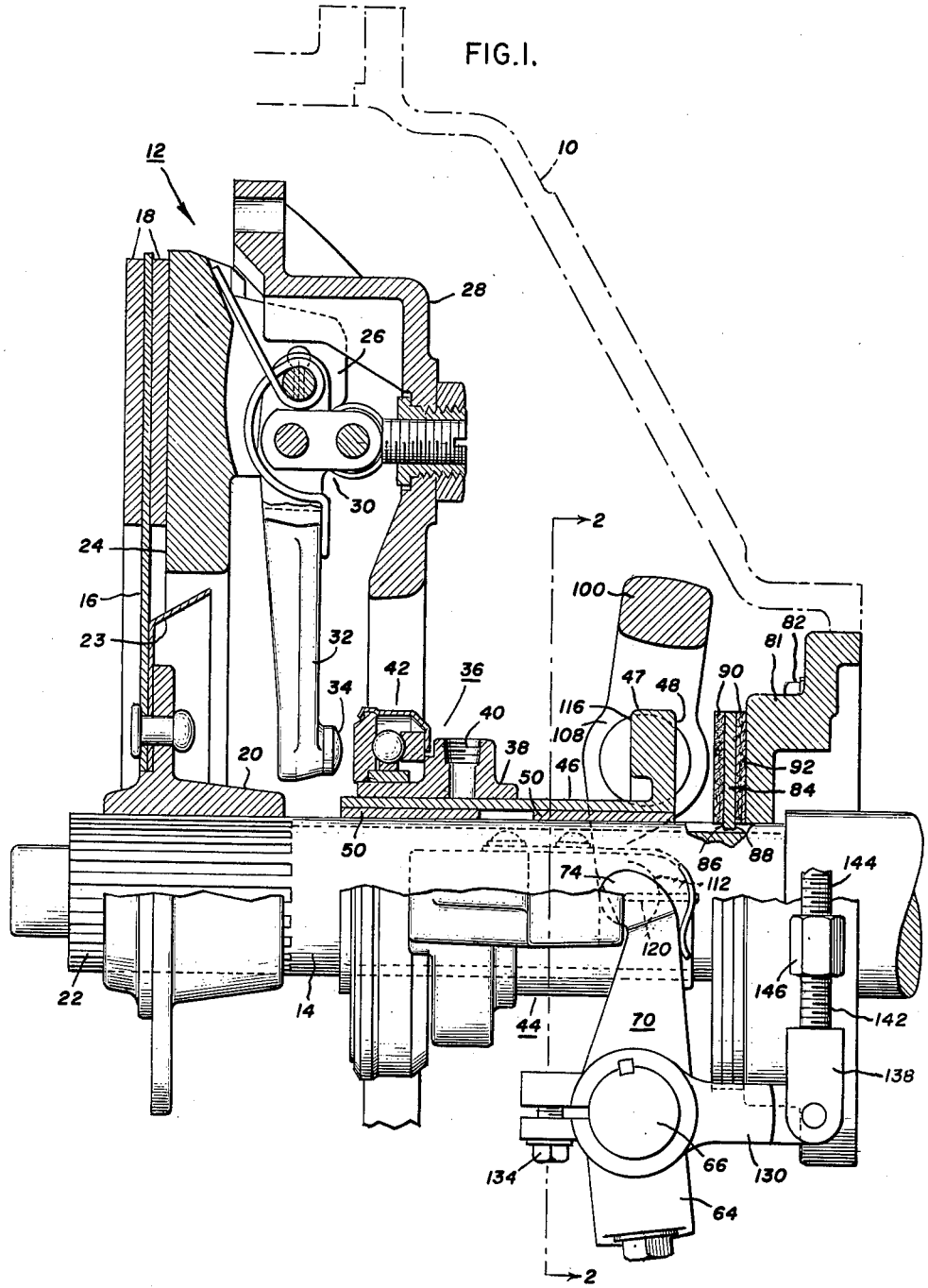
FIGURE 1 is a fragmentary side elevational view with parts broken away and parts in section of the preferred embodiment of the invention.

In FIGURE 1, the dashed lines at 10 indicate the conventional bell housing in which the clutch is mounted. The clutch, generally indicated by the reference numeral 12, is of the conventional push type utilizing a plurality of coil springs, not shown, to maintain the driving member, not shown, and the driven member which may be the shaft 14, in driving engagement. The means for effecting the driving engagement may comprise a plurality of conventional friction plates, one of which is shown at 16, having a pair of friction faces 18 on opposite sides thereof about its outer periphery. The plate 16 is affixed to a hub 20, which is in turn keyed to splines 22 formed in the forward portion of the shaft 14. The hub 20 may be also provided with an oil slinger, generally indicated at 23. The friction disc 16 is maintained in engagement with the driven member by means of a pressure plate 24, which is made up of an annulus, as best seen in FIGURE 1, and is provided at a plurality of points about its outer periphery with a pair of upstanding bosses 26. A connection is effected between an annular cover 28 and the pressure plate 24 by means of a conventional linkage arrangement indicated at 30 including a release lever 32 having a pressure face 34 positioned radially inwardly of the clutch at a point adjacent to the hub 20.

A clutch throw-out member, generally indicated by reference numeral 36, comprising a bearing carrier 38 having provision for an oil fitting 40, carries a thrust bearing 42, which is adapted to engage the pressure faces 34 of the release levers 32 upon movement of the carrier 38 to the left, as viewed in FIGURE 1. The carrier 38 is slidably mounted on a braking means, including a member, generally indicated by the reference numeral 44, having a sleeve-like portion 46 and a flange portion 47 being formed on its rear surface with a brake-face portion 48. The member 44 is journalled on the shaft 14 by means of a pair of bushings 50 and the member 44 and bushings 50 are mounted for axial movement on the driven shaft 14.

As best seen in FIGURE 3, the bearing carrier 38 is provided with a pair of radially outwardly extending arms 52 and 54, which terminate in rearwardly extending portions 56 and 58, respectively. The rearwardly extending portions 56 and 58 terminate in pressure faces 60 and 62.

Figure 2:
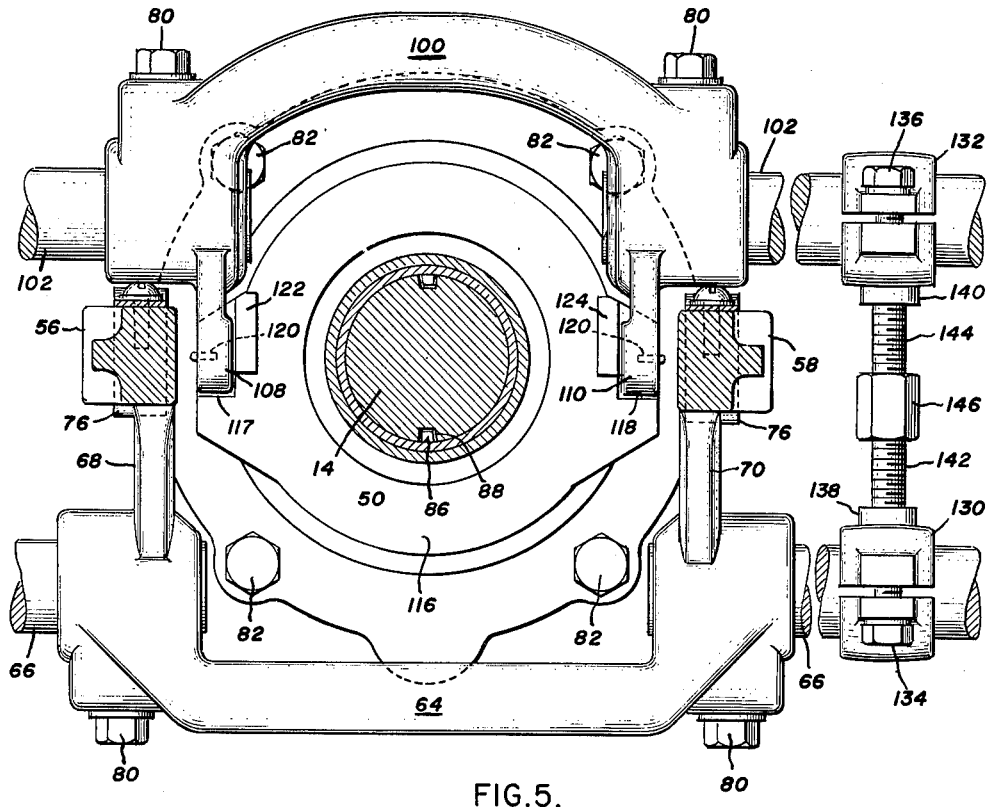
FIGURE 2 is a view taken looking in the direction of the arrows of line 2—2 on FIGURE 1.

A clutch yoke member, best seen in FIGURE 2, and identified by the reference numeral 64, is mounted on the inwardly extending portions of a split shaft 66 for arcuate motion about the center of the shaft 66. The shaft 66 is mounted in bosses formed in the bell housing 10 in the conventional manner and the clutch yoke member 64 is formed with a pair of upwardly extending legs 68 and 70. The upper end portions of the legs 68 and 70 terminate in forwardly extending portions 72 and 74, which engage, respectively, the pressure faces 60 and 62 of the arms 52 and 54 of the bearing carrier 38, whereby when the clutch yoke member 64 is oscillated with the split shaft 66 in a counter-clockwise direction, as viewed in FIGURES 1 and 4, the bearing carrier 38 is pushed inwardly on the sleeve portion 46 of member 44 thereby effecting a disengagement of the driving connection between the driving and driven members through the release levers 32 in the conventional manner.

Each of the arms 52 and 54 of the carrier 38 has an L-shaped spring 76, which is affixed to the respective arms by means of screws, or the like, 78. The springs 76, as best seen in FIGURE 4, engage the rear of the legs 68 and 70 of the clutch yoke member 64 to maintain the legs in engagement with the pressure faces 60 and 62 of the bearing carrier 38. The clutch yoke member 64 is fixedly mounted on the split shaft 66 by any suitable means, such as set screws 80.

As indicated in FIGURE 2 by the broken lines, the split shaft 66 extends outwardly of the bell housing 10 and is connected in the conventional manner to the clutch releasing pedal in the automotive vehicle whereby when the operator of the vehicle pushes in the clutch pedal the shaft 66 is oscillated to disengage the clutch in the manner just described.

The oscillation of the shaft 66 is utilized to cause the member 44 to move rearwardly to brake the driven shaft 14 to a halt. Mounted on the inner end of the shaft 14, adjacent to a bearing cover 81 mounted by means of bolts 82 on the face of the transmission housing (not shown), is a friction disc 84, which is formed with a pair of keys 86, which are received in key ways 88 formed in the shaft 14. The disc 84 is provided with a pair of friction faces 90 whereby when the disc 84 is engaged by the friction face 48 on the member 44 and urged into engagement with the friction face 92 formed on the bearing cover 81, the driven shaft 14 will be braked.

Figure 5:
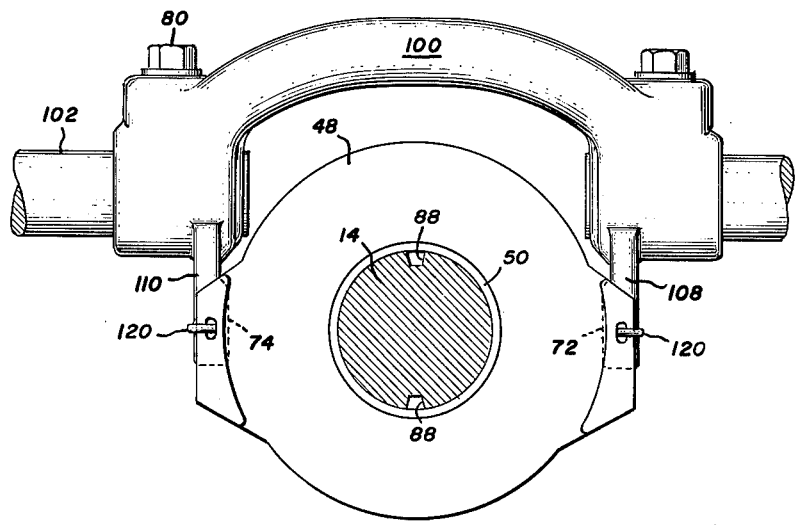
FIGURE 5 is a view taken looking in the direction of the arrows of line 5—5 on FIGURE 4.

The mechanism for moving the member 44 axially rearwardly on the shaft 14 comprises a brake yoke member 100 fixedly mounted on a split shaft 102 which is journalled in the bell housing 10 similarly to the split shaft 66. The brake yoke 100 includes a pair of downwardly extending legs 108 and 110, see FIGURES 2 and 5, and the legs 108 and 110 are each formed with pressure surfaces 112 and 114, respectively, see FIGURE 4. The flange 47 is provided on the surface 116 opposite the brake face 48 with a pair of flat surfaces 117 and 118 against which the pressure surfaces 112 and 114, respectively, of the legs 108 and 110 are received. Accordingly, when the brake yoke member 100 is oscillated in a counter-clockwise direction about the split shaft 102, as viewed in FIGURES 1 and 4, the pressure surfaces 112 and 114 engage the flat surfaces 116 and 118 on the rear of the flange 47 and will move the member 44 rearwardly so as to cause the brake surface 48 to engage the forward friction facing 90 on the disc 84. Continued movement will cause the friction disc 84 to be engaged between the brake face 48 on the member 44 and the brake face 92 on the transmission housing 82 whereby to slow the rotation of the shaft 14. A pair of retractor springs 120 are provided to maintain the arms 108 and 110 in engagement with the flat surfaces 117 and 118 formed on the rear of the hub 47 and the springs 120 serve to insure the return movement of the member 44 with the legs 108 and 110 of the brake yoke 100. As best seen in FIGURES 2 and 5, the surface 116 of flange 47 is provided with a pair of bosses 122 and 124 which serve to guide and maintain the legs 108 and 110 in engagement with the pressure surfaces 116 and 118.

The means for interconnecting the split shafts 66 and 102 so as to effect oscillation of the shaft 102 upon oscillation of the shaft 66 comprises a pair of bifurcated levers 130 and 132 which are clamped, as best seen in FIGURE 2, by means of bolts 134 and 136 to the shafts 66 and 102, respectively. The levers 130 and 132 extend rearwardly, sa shown in FIGURES 1 and 4, and are pivotally connected as at 138 and 140 to a pair of oppositely threaded studs 142 and 144. The outer threaded portions of the studs 142 and 144 are received in a threaded nut 146 so formed as to permit the members 142 and 144 to be adjusted toward or away from each other by rotation of the nut 146 whereby to permit adjustment of thus formed parallelogram linkage connection between the split shaft 66 and split shaft 102.

As will be obvious, yoke members 64 and 100 and the linkage mechanism 130, 132, 142, 144 and 146 comprise what may be termed "motion reversing means" to cause the member 44 to be moved to the right, as viewed in FIGURE 1, simultaneously with the movement of the bearing carrier 38 to the left, as viewed in FIGURE 1, in order to first effect the disengagement of the driving connection between the driving and driven members of the clutch and then to brake the rotation of the driven shaft 14.

What I claim is:

In a friction clutch having a driving member and a driven shaft normally in driving engagement, brake means for braking said driven shaft after said driving engagement is disengaged, said brake means comprising a sleeve journalled on said driven shaft, clutch releasing means mounted on said sleeve, motion transmitting means mounted on a pair of split shafts and being operable when actuated to move said clutch releasing means on said sleeve toward said driving member to disengage said driving engagement between said driving member and said driven shaft, motion reversing means operable upon actuation of said motion transmitting means to move said sleeve rearwardly on said driven shaft, the rearward end of said sleeve being formed with a brake face, a fixed brake located a spaced distance rearwardly of said brake face formed on said sleeve, a brake member fixed to said shaft intermediate said brake face formed on said sleeve and said fixed brake face, whereby rearward movement of said sleeve engages said brake member fixed on said driven shaft between said fixed brake face and said brake face formed on said sleeve to brake the rotation of said driven shaft, said motion transmitting means comprising a first yoke member mounted for rotation on one of said split shafts, said yoke member having a pair of arms engaging said clutch releasing means whereby oscillation of the split shaft on which said first yoke member is mounted moves said clutch releasing means toward said driving member, a second yoke member mounted on the second of said split shafts, a pair of arms formed on said second yoke member engaging said sleeve, and linkage mechanism for transmitting the movement of said first yoke member to said second yoke member to move said sleeve rearwardly on said driven shaft.

References Cited by the Examiner

UNITED STATES PATENTS

| 1,652,446 | 12/27 | Link | 192—13 X |
| 1,689,245 | 10/28 | Klimek | 192—3.2 X |
| 1,880,066 | 9/32 | Barnes | 192—13 X |
| 1,885,516 | 11/32 | Fast | 192—13 X |
| 2,590,089 | 3/52 | Cook | 192—13 |
| 3,105,579 | 10/63 | Moore | 192—13 |

DON A. WAITE, *Primary Examiner.*

DAVID J. WILLIAMOWSKY, THOMAS J. HICKEY,
*Examiners.*